United States Patent Office 3,799,789
Patented Mar. 26, 1974

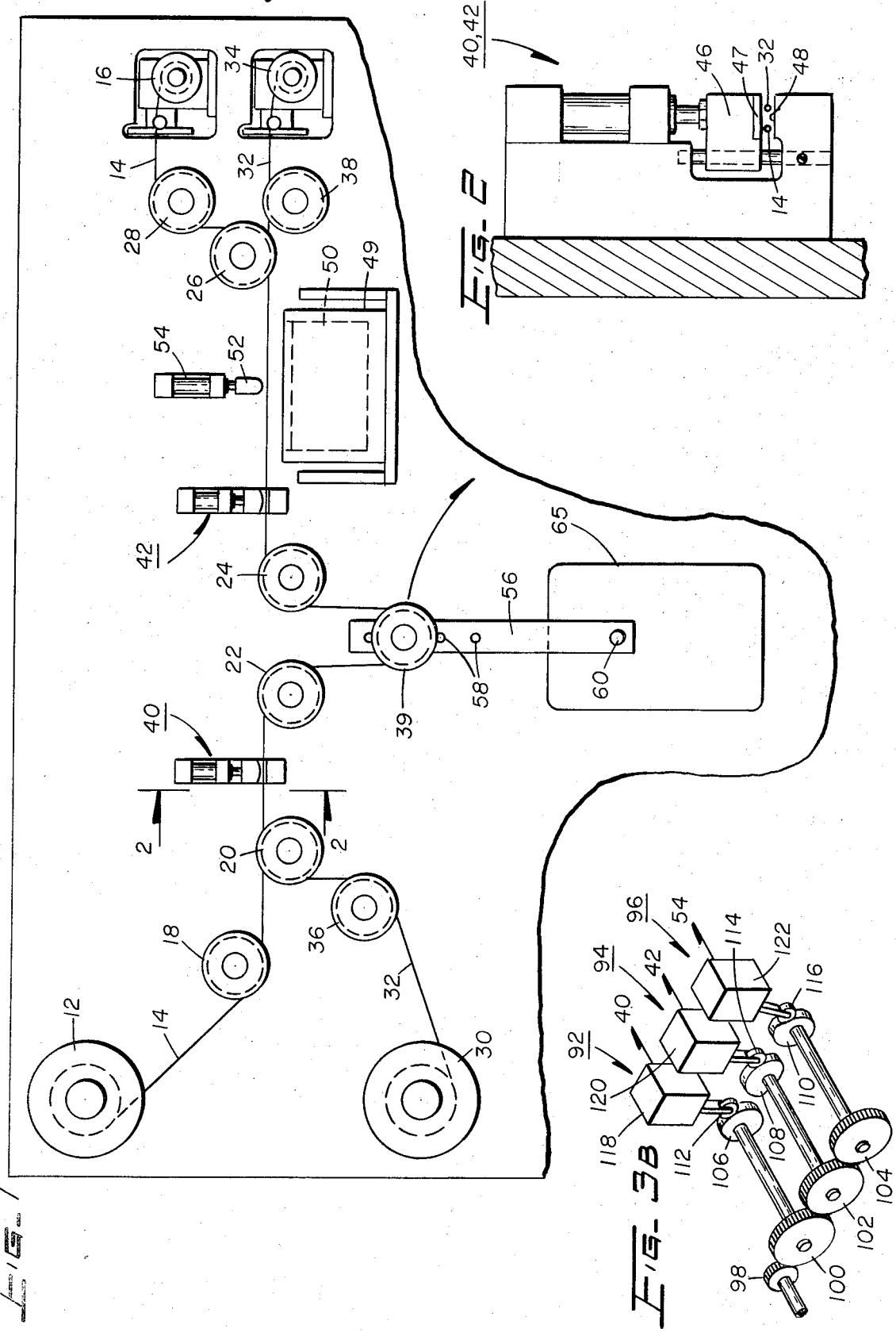

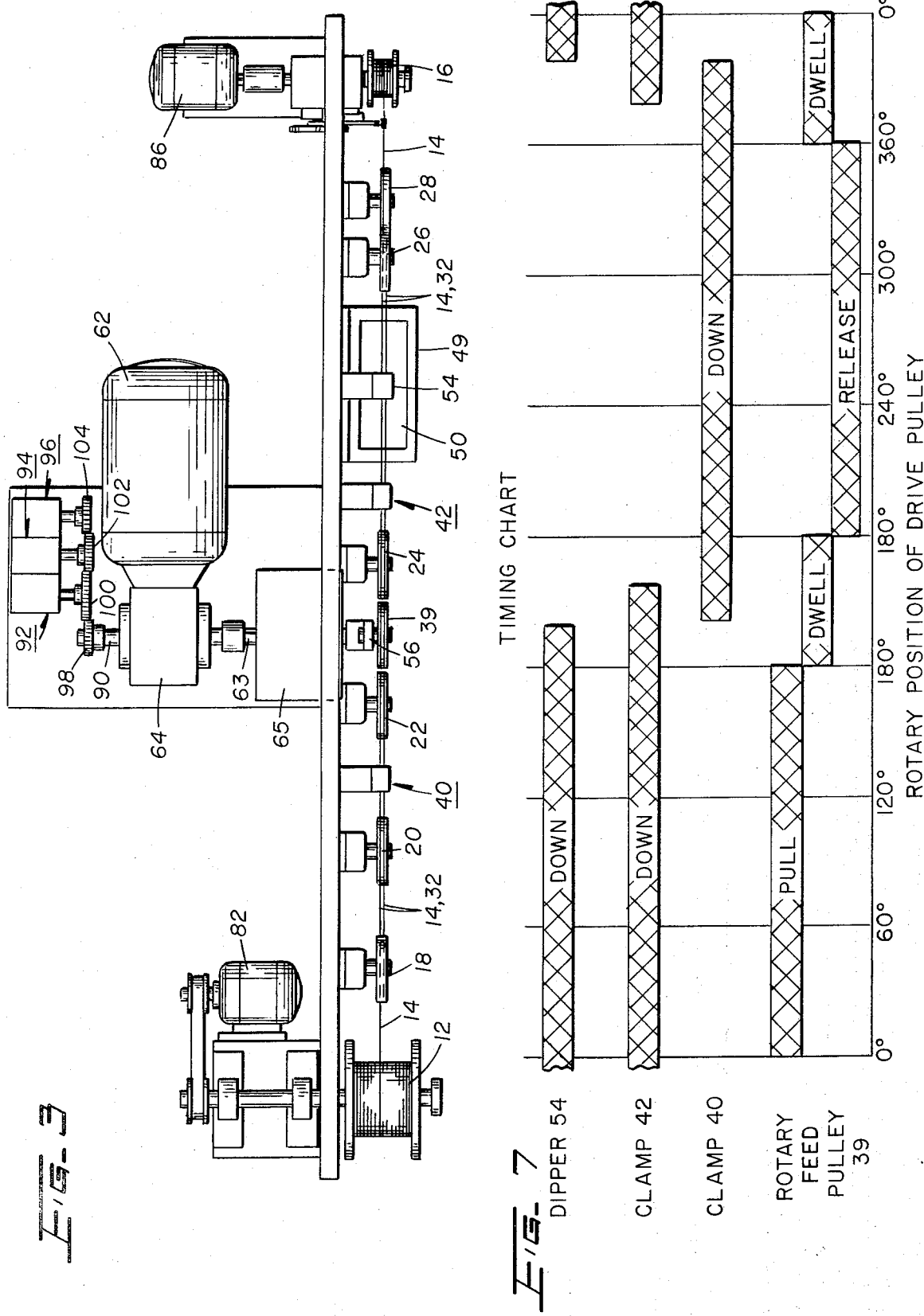

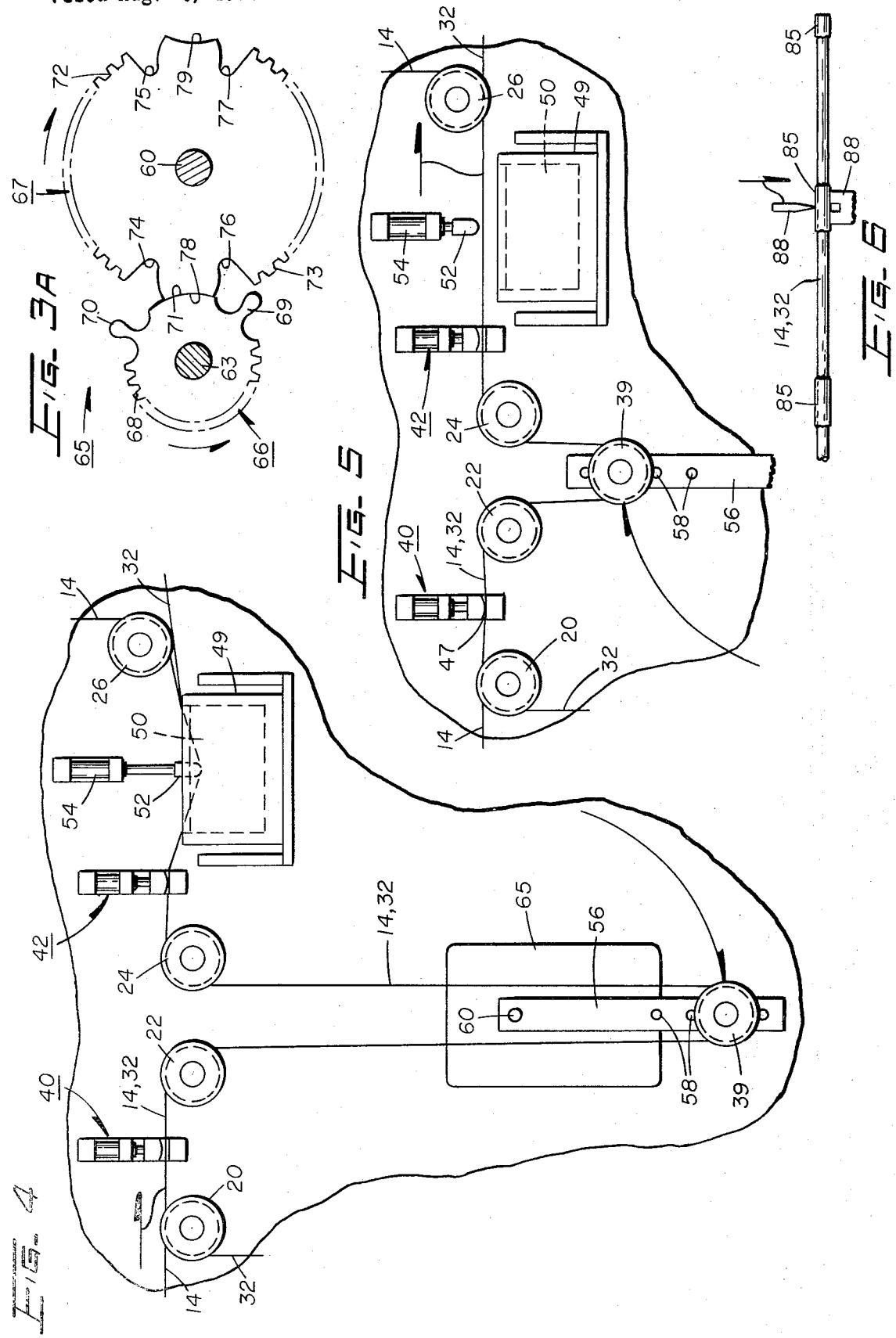

3,799,789
METHOD OF TINNING WIRE
Jacques D. Pierre-Louis, Chicago, and Donald K. Sandmore, Oak Lawn, Ill., assignors to Western Electric Company, Incorporated, New York, N.Y.
Filed Aug. 16, 1972, Ser. No. 281,051
Int. Cl. C23c 1/04
U.S. Cl. 117—4
9 Claims

ABSTRACT OF THE DISCLOSURE

Equal lengths of a continuous supply of wire are incrementally advanced across a supply of molten solder. During the dwell between each incremental advance of the wire, a portion of each successive advanced length of wire is immersed into the solder to form a solder coating, or tinning, thereon. The continuous length of wire, having a plurality of solder coated portions with non-solder coated sections therebetween, is then severed at the center of each of its solder coated portions to form a plurality of wires having solder coated ends with non-solder coated sections therebetween.

BACKGROUND OF THE INVENTION

(1) Field of the invention

The present invention relates to apparatus for, and methods of, tinning wire, and in particular to apparatus for, and methods of, tinning wire wherein a plurality of tinned portions, formed on a continuous length of wire, are severed at their centers to form a plurality of wires having tinned ends with a non-tinned section therebetween.

(2) Description of the prior art

Lengths of wire employed in soldered electrical apparatus are normally pre-solder coated, or tinned, at their ends, to facilitate wetting of the wires with solder when the wires are soldered into the apparatus. One commonly employed technique for pre-solder coating the ends of wires contemplates manually immersing the ends of pre-skinned lengths of wire (lengths of insulated wire having the insulation removed from the end portions thereof) into a supply of a molten solder to form a solder coating thereon. This technique is time consuming, in that a manual operation is involved, and is therefore expensive.

A second technique for solder coating wires, which is more economical than the first technique, contemplates advancing a continuous length of uninsulated wire through a supply of molten solder to form a solder coating over the entire length of the wire. The continuous length of solder coated wire is then severed into shorter, useful lengths of wire which, while having solder coated ends, are also solder coated over their entire length. While this technique for tinning wires is more economical than the first technique, it is wasteful of solder and of limited usefulness since the wires tinned thereby are conductive over their entire length, and therefore cannot be used where danger of a shock hazard or a short exists.

SUMMARY OF THE INVENTION

In accordance with the present invention, a wire is tinned along spaced portions thereof by advancing a continuous length of the wire over a supply of solder and by periodically immersing spaced portions of the advancing wire into the solder to form a solder coating thereon, so that the wire has a plurality of solder coated sections with non-solder coated sections therebetween.

Preferably, a first tension force is applied to the wire extended in an initial path across the solder tending to advance the wire along a first direction and a second tension force is applied to the wire tending to move the wire along the opposite direction. The wire is then clamped at a first point to hold the wire against moving by the first tension force, and a length of the wire is moved from the initial path against the applied second tension force. The wire is then both clamped at a second point, to hold the wire against moving by the second tension force, and unclamped at the first point, and the length of wire is moved back to the initial path to render effective the first tension force to advance the length of wire across the solder.

After the length of wire has been advanced across the solder the wire is clamped at the first point and a portion of the advanced length is immersed into the molten solder to form a solder coating thereon. The immersed portion of the wire is then removed from the solder to restore the wire to the initial path, and the aforesaid steps are cyclically repeated to solder coat spaced portions of the wire.

Another aspect of the invention contemplates tinning the ends of a plurality of wires coated with an insulation that is removable by the application of heat. In this case, a continuous length of wire having the heat removable insulation coating is advanced over a supply of solder maintained at a temperature sufficient to remove the insulation coating. As the wire advances over the molten solder, spaced portions of the advancing wire are periodically immersed into the solder to remove the insulation coating and to apply solder to the wire. The continuous length of wire is then severed at the center of each solder coated portion to form a plurality of lengths of wires having tinned ends with an insulation coated section therebetween.

Other objects, advantages and features of the invention will be apparent upon consideration of the following detailed description when taken in conjunction with the appended drawings.

BRIEF DESCRIPTION OF THE DRAWINGS

FIG. 1 is a side elevation view of an apparatus embodying the principles of the present invention, showing two wires being solder coated along portions thereof;

FIG. 2 is a sectional view, taken along the line 2—2 of FIG. 1, and shows an arrangement for a clamp for arresting movement of the wires being solder coated;

FIG. 3 is a top plan view of the apparatus of the invention illustrating the arrangement of the various drive mechanisms;

FIG. 3A shows an arrangement for the indexing mechanism of FIG. 3;

FIG. 3B shows an arrangement for the timing control mechanism of FIG. 3;

FIG. 4 illustrates the configuration of the puller mechanism of FIG. 1 immediately after a length of each of two wires has been withdrawn from a wire supply and while a portion of each wire is being solder coated;

FIG. 5 illustrates the configuration of the puller mechanism of FIG. 1 immediately after the two withdrawn lengths of wire have been advanced to a wire take-up;

FIG. 6 shows a length of wire, which has been solder coated by the apparatus of FIG. 1, being severed at the center of a solder coated portion, and FIG. 7 is a timing chart showing the sequence of operation of the apparatus illustrated in FIGS. 4 and 5.

DETAILED DESCRIPTION

The wire tinning apparatus of the present invention, as shown in FIG. 1, includes a wire supply reel 12 for supplying a wire 14 to a wire take-up reel 16 through a plurality of rotatably mounted guide pulleys 18, 20, 22, 24, 26 and 28. Also included is a second wire supply reel 30 for supplying a second wire 32 to a wire take-up reel 34 through common guide pulleys 20, 22, 24 and 26, as well as through two additional guide pulleys 36 and 38. Preferably, the wires 14 and 32 are insulated with a coating of varnish or other material that is readily removable or vaporizable at the temperature of molten solder. Both of the wires 14 and 32 also pass around a common driver pulley 39 and between the jaws of two solenoid or pneumatic actuated clamps 40 and 42, the clamp 40 being positioned between the guide pulleys 20 and 22 and the clamp 42 being positioned between the guide pulleys 24 and 26. As shown in FIG. 2 the clamp 40, which is identical with the clamp 42, is actuable to drive a movable upper jaw, having a resilient pad 47 secured to the lower surface thereof, downward toward a fixed lower jaw 48 to clamp the wires 14 and 32 between the resilient pad 47 and the jaw 48 to arrest their movement therethrough.

The wires 14 and 32, after being carried through the jaws of the clamp 42 are carried across a tank 49, having a supply of molten solder 50, and beneath a nonsolder wetting plunger 52 of a solenoid or pneumatic actuated dipper 54. The dipper 54 is actuable to drive the plunger 52 downward to dip, or immerse, a portion of the wires 14 and 32 therebeneath into the molten solder 50.

The driver pulley 39 is mounted for rotation on an arm 56 in one of a plurality of mounting holes 58 formed along the length of the arm 56 and adapted to receive the pulley 39. The arm 56 is in turn secured at an end thereof to a shaft 60 for rotary movement therewith. Rotation of the shaft 60 carries the driver pulley 39 in a circular orbit, or arc, the plane of which is parallel to the paths of the wires 14 and 32 and the radius of which is equal to the spacing between the driver pulley 39 and the shaft 60. As is evident, the radius of the orbit defined by the driver pulley 39 is dependent upon the particular mounting hole 58 into which the pulley 39 is received.

As shown in FIG. 3, a motor 62 operates through a first output shaft 63 of a differential 64 to apply a constant rotational input to a speed reducing the dwell, or indexing, mechanism 65 to obtain an intermittent rotational output therefrom. The output from the mechanism 65 is connected to the shaft 60 to rotate the shaft 60 and to carry the driver pulley 39 in a circular orbit. The speed reducing and dwell mechanism 65 is characterized in that, with the constant rotational input applied thereto, a reduced speed rotational output, having a rotational dwell or zero rotation rate every 180°, is obtained therefrom. The input-output relationship of the mechanism 65 may be readily accomplished with a gearing arrangement, such as that shown in FIG. 3A, wherein a constantly rotating gear 66, driven by the first output shaft 63 of the differential 64, is arranged to cooperate with a gear 67, which drives the shaft 60 and therefore the driver pulley 39, to intermittently index or rotate the gear 67 through 180° revolutions. The gear 66 has a plurality of gear teeth 68 which extend around only a portion of its periphery, and two radially projecting fingers 69 and 70 with a convex formed surface 71 therebetween carried along the remainder of the periphery. The gear 67 has first and second pluralities of gear teeth 72 and 73 carried on separate and symmetrical portions of the periphery thereof, the number of teeth in each of the pluralities of teeth 72 and 73 being equal to the number of teeth 68 on the gear 66. Formed in the periphery of the gear 67, at opposite ends of the teeth 72, are two recessed areas 74 and 75 for receiving the fingers 69 and 70, and at opposite ends of the teeth 73 are two recessed areas 76 and 77 also for receiving the fingers 69 and 70. Between the recessed areas 74 and 76, and along the periphery of the gear 67, is a concave surface 78, and between the recessed areas 75 and 77 is a concave surface 79, both of the concave surfaces 78 and 79 being complementary in shape with the convex surface 71 and at 180° with respect to each other.

The arrangement of the gears 66 and 67 is such that as the gear 66 rotates one revolution in a counterclockwise direction the finger 69 is received in the recessed area 76 to rotate the gear 67 to a position for meshing engagement between the gear teeth 68 and the gear teeth 73. Continued rotation of the gear 66 rotates the gear 67 until the finger 70 is received in the recessed area 77 to bring the concave surface 79 into sliding engagement with the convex surface 71. At this point the gear 67 has been rotated through 180°, and rotation thereof is temporarily stopped, as the surface 71 slides across the surface 79, until the gear 66 has rotated sufficiently to bring the finger 69 thereof into the recessed area 75. The next revolution of the gear 66 indexes the gear 67 through an additional 180° in a similar manner, so that the output of the mechanism 65, as applied to the shaft 60, is a series of intermittent 180° revolutions. The connection between the shaft 60 and the arm 56 is such that the driver pulley 39, while being carried in its circular orbit, temporarily stops, or dwells, while in its uppermost, or 0° position, and in its lowermost, or 180° position, as it advances along its orbit.

As also shown in FIG. 3, a constant torque motor 82 is associated with each of the supply reels 12 and 30, and a constant torque motor 86 is associated with each of the wire take-up reels 16 and 34, to apply a torque to each of their associated reels, in a direction tending to wind up the wire associated with that reel, to maintain the wires 14 and 32 taut as they extend from the supply reels to the take-up reels.

To tin the essentially continuous lengths of wires 14 and 32, the motor 62 is energized to rotate the shaft 60 and to carry the driver pulley 39 in a clockwise circular orbit. With the driver pulley 39 dwelling in its 0°, or uppermost, position, the clamp 42 is actuated to arrest movement of the wires therethrough, the dipper 54 is actuated to drive the plunger 52 downward to force portions of the wires 14 and 32 therebeneath into the supply of solder 50, and the clamp 40 is deactuated to permit movement of the wires therethrough. When the wires 14 and 32 are immersed into the solder 50, the heat of the molten solder removes the varnish insulation on the portions of the wires 14 and 32 immersed therein and forms a solder coating thereon.

At the end of the dwell, as shown in FIG. 4, rotation of the driver pulley 39 in its circular orbit past its 0° orientation operates to pull lengths of the wires 14 and 32 from the wire supply reels 12 and 30 and through the jaws of the clamp 40. During this time, the actuated clamp 42 prevents the driver pulley 39 from pulling wire from the take-up reels 16 and 34. When the driver pulley 39 is a function of the radius of the circular orzit de-rotation thereof is temporarily stopped while the solenoid clamp 40 is actuated and while the solenoid clamp 42 and the dipper solenoid 54 are deactuated. At this point, a length of wire, which is equal to twice the diameter or four times the radius of the orbit defined by the driver pulley 39, has been drawn from each of the supply reels 12 and 30, against the resistance of the constant torque motors 82, and a portion of a previous length of each wire 14 and 32 has been tinned in the supply of solder 50.

At the end of the dwell, continued rotation of the driver pulley 39 past its 180° position, with the clamp 40 actuated and with the clamp 42 and the dipper 54 deactuated, as shown in FIG. 5, through an additional 180° to its original 0° position, releases lengths of each of the wires 14 and 32. The lengths released are equal in length to that length which was withdrawn from each of the wire supply reels 12 and 30, and pass through the jaws of the clamp 42, across the supply of molten solder 50 and to the take-up reels 16 and 34, under the urging of the take-up reel motors 86. During this time, the actuated clamp 40 prevents the wire, which was originally withdrawn from the wire supply reels 12 and 30, from retrograde movement back to the supply reels 14 and 32 which are under constant torque tending to rewind the wires.

With the driver pulley 39 again in its 0° position, a dwell again occurs and rotation thereof is temporarily stopped while the clamp 42 and the dipper 54 are actuated, and while the clamp 40 is deactuated, to prepare the apparatus for a repetition of the sequence of operation just described. Continued repetition of the sequence results in a length of wire being accumulated on each of the take-up reels 16 and 34, each length having a plurality of solder coated portions thereof with non-solder coated sections therebetween.

The accumlated solder coated wire, such as the wire 14 as shown in FIG. 6, may be severed at the center of each of the solder coated, or tinned, portions 85, with any conventional wire cutting device, such as a pair of wire cutter jaws 88, to obtain a plurality of individual wires having tinned ends and insulated, non-solder coated sections therebetween. The length of each of the individual wires is equal to the length of each wire withdrawn from the supply reels 14 and 30 with each revolution of the driver pulley 39. It is to be appreciated that, since the length of each wire withdrawn from the supply reels 14 and 30 with each revolution of the driver pulley 39 is a function of the radius of the circular orbit defined by the pulley 39, the lengths may be adjusted to any predetermined length by mounting the driver pulley 39 in an approprate mounting hole 58 on the arm 56.

FIG. 7 shows the actuation sequence of the clamps 40 and 42 and of the dipper 54, and the function sequence of the driver pulley 39, with respect to the rotational position of the driver pulley 39. To control the actuation timing sequence of the clamps 40 and 42 and of the dipper 54 with respect to the rotary position of the driver pulley 39, a second output shaft 90 from the differential 64, which has a fixed rotational relationship with respect to the first output 63 of the differential 64 and therefore with respect to the pulley 39, is employed to index three timing control devices 92, 94 and 96. Indexing is accomplished with a drive gear 98, secured to the second output 90 of the differential 64, which drives a train of three timing gears 100, 102 and 104 associated, respectively, with the timing control devices 92, 94 and 96.

The timing control devices may be of any conventional type, such as the cam follower switch types shown in FIG. 3B. In this case the timing gears 100, 102 and 104, driven in a rotational relationship with the driver pulley 39 by the drive gear 98, rotate three cams 106, 108 and 110, respectively, through connecting drive shafts. Associated with the cams 106, 108 and 110 are followers 112, 114 and 116, respectively, for opening and closing associated switches 118, 120 and 122. The switches 118, 120 and 122 control actuation of the solenoid or pneumatic actuated clamps 40, 42 and 54, respectively, and the cams 106, 108 and 110 are designed to accomplish the timing sequence shown in FIG. 7. The switches 118, 120 and 122 may be either electrical or pneumatic in accordance with whichever type of clamp actuator is controlled thereby, the type of control, either electrical or pneumatic, being merely a matter of choice in the practice of the invention.

While one particular embodiment of the invention has been described in detail, it is understood that various other modifications and embodiments may be devised by one skilled in the art without departing from the spirit and scope of the invention. For example, rather than intermittently advancing lengths of wire across the molten solder 50, the wires 14 and 32 may be continuously advanced across the solder while spaced portions thereof are intermittently immersed into the solder to form a solder coating thereon.

What is claimed is:

1. In a method of tinning wire along spaced portions thereof:
   advancing a continuous length of wire over a supply of molten solder, and
   periodically immersing spaced portions of the advancing wire into the solder to form a solder coating thereon, so that the wire has a plurality of solder coated portions with non-solder coated sections therebetween.

2. In a method of applying solder at spaced positions along a wire:
   incrementally advancing lengths of a continuous wire over a supply of molten solder, and
   dipping, following each incremental advance, a portion of each successive advanced length of wire over the solder into the solder to form a solder coating thereon, so that the wire has a plurality of solder coated portions at spaced positions along the wire with non-solder coated sections therebetween.

3. In a method as recited in claim 2, wherein the incremental advancing step comprises:
   first withdrawing a length of wire from a supply of wire, and thereafter
   advancing the withdrawn length of wire over the solder and to a wire take-up.

4. In a method of tinning a wire:
   extending a wire in an initial path across a supply of molten solder;
   applying a first tension force to the wire tending to advance the wire along a first direction;
   applying a second tension force to the wire tending to advance the wire along the opposite direction;
   clamping the wire at a first point to hold the wire against moving by the first tension force;
   moving a length of wire from the initial path against the applied second tension force;
   clamping the wire at a second point to hold the wire against moving by the second tension force;
   unclamping the wire at the first point;
   moving the length of wire back to the initial path to render effective the first tension force to advance the length of wire across the supply of solder;
   clamping the wire at the first point;
   immersing a portion of the advanced length of wire into the molten solder to form a solder coating thereon;
   removing the portion of the wire from the solder to restore the wire to the initial path;
   cyclically repeating the aforesteps to solder coat spaced portions of the wire.

5. In a method as recited in claim 4:
   severing the wire at the center of each solder coated portion to form a plurality of lengths of wires having solder coated ends with a non-solder coated section therebetween.

6. In a method of tinning wires coated with an insulation that is removable by the application of heat thereto:
   advancing a continuous length of a wire, having the heat removable insulation coating, over a supply of solder maintained at a temperature sufficient to remove the insulation coating, and
   periodically immersing spaced portions of the advancing wire over the solder into the solder to remove the insulation coating and to apply solder to the wire.

7. In a method as recited in claim 6:
   severing the wire at the center of each solder coated portion to form a plurality of lengths of wires having tinned ends with an insulation coated section therebetween.

8. In a method of applying solder at spaced positions along a wire:
   periodically withdrawing a length of continuous wire from a supply of wire;
   advancing, after each withdrawing step, the withdrawn length of wire over a supply of solder, and
   dipping, following each advancing step, the portion of each successive advanced length of wire over the solder into the solder to form a solder coating thereon, to form on the wire a plurality of solder coated portions at spaced positions along the wire with non-solder coated sections therebetween.

9. In a method of tinning the ends of a plurality of wires coated with an insulation that is removable by the application of heat thereto:

periodically withdrawing a length of continuous wire, having a heat removable insulation coating, from a supply of wire;

advancing, after each withdrawing step, the withdrawn length of wire over a supply of solder maintained at a temperature sufficient to remove the insulation coating;

immersing, following each advancing step, a portion of each successive advanced length of wire over the solder into the solder to remove the insulation coating and to apply solder to the wire, to form on the wire a plurality of solder coated portions at spaced positions along the wire with insulated, non-solder coated sections therebetween, and severing the wire at the center of each solder coated portion to form a plurality of lengths of wires having tinned ends with an insulation coated section therebetween.

References Cited
UNITED STATES PATENTS

| | | | |
|---|---|---|---|
| 3,385,259 | 5/1968 | Orban et al. | 118—423 |
| 3,394,441 | 7/1968 | Weiss | 117—113 |
| 2,884,893 | 5/1959 | Kabelitz | 118—33 |
| 3,551,185 | 12/1970 | Schwieterman et al. | 117—114 R |
| 3,330,275 | 7/1967 | Jenard et al. | 117—37 R |

DOUGLAS J. DRUMMOND, Primary Examiner

J. MASSIE, Assistant Examiner

U.S. Cl. X.R.

117—114 B, 128, 212; 118—6, 425